United States Patent
Briand et al.

(10) Patent No.: US 6,287,372 B1
(45) Date of Patent: Sep. 11, 2001

(54) ANTI-CORROSIVE COATING

(75) Inventors: Remi Briand, Leawood, KS (US); Hylen Keith Freeman, Kansas City, MO (US)

(73) Assignee: Themec Company Incorporated, North Kansas City, KS (US)

(*) Notice: Subject to any disclaimer, the term of this patent is extended or adjusted under 35 U.S.C. 154(b) by 0 days.

(21) Appl. No.: 09/539,843

(22) Filed: Mar. 31, 2000

(51) Int. Cl.⁷ ........................................... C09D 5/10
(52) U.S. Cl. ............... 106/14.05; 106/623; 106/286.6; 106/286.8; 106/287.16; 106/287.11; 106/14.21
(58) Field of Search ............... 106/14.05, 14.21, 106/623, 286.6, 286.8, 287.16, 287.11

(56) References Cited

U.S. PATENT DOCUMENTS

| | | | |
|---|---|---|---|
| 4,086,096 | * 4/1978 | McLeod | 106/1.17 |
| 4,230,496 | 10/1980 | Falcone, Jr. et al. | |
| 4,239,539 | 12/1980 | Ginsberg et al. | |
| 4,621,024 | 11/1986 | Wright . | |
| 4,728,544 | 3/1988 | Asoshina et al. | |
| 4,891,394 | 1/1990 | Savin . | |
| 4,931,491 | 6/1990 | Savin . | |
| 5,098,938 | 3/1992 | Savin . | |
| 5,164,003 | * 11/1992 | Bosco et al. | 106/287.1 |
| 5,167,701 | 12/1992 | Savin . | |
| 5,182,318 | 1/1993 | Savin . | |
| 5,186,743 | * 2/1993 | Flasch | 106/38.35 |
| 5,252,632 | * 10/1993 | Savin | 523/137 |
| 5,275,645 | 1/1994 | Ternoir et al. | |
| 5,284,697 | 2/1994 | Sorathia et al. | |
| 5,334,631 | 8/1994 | Durand . | |
| 5,338,348 | * 8/1994 | Savin | 106/14.44 |
| 5,413,628 | 5/1995 | Savin . | |
| 5,521,012 | 5/1996 | Aklian et al. | |
| 5,580,907 | 12/1996 | Savin . | |
| 5,677,367 | 10/1997 | Savin . | |
| 5,792,803 | 8/1998 | Savin . | |
| 5,985,957 | 11/1999 | Sakakibara et al. | |

* cited by examiner

Primary Examiner—Margaret G. Moore
(74) Attorney, Agent, or Firm—Kyle L. Elliott; Blackwell, Sanders, Peper, Martin LLP

(57) ABSTRACT

An improved anti-corrosive zinc coating composition for application on a metal substrate is provided. The coating is comprised of a siloxane polymer resin in combination with zinc dust and ceramic microspheres, the microspheres having diameters of 45 microns or less. At this reduced diameter, the microspheres act as spacers for the zinc particles without interfering with the conductivity of the coating, thereby reducing the amount of zinc necessary to achieve cathodic protection of the substrate. The coating is economical to produce, provides excellent corrosion protection, and resists mud-cracking.

30 Claims, No Drawings

ANTI-CORROSIVE COATING

COPYRIGHT NOTICE AND AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates in general to an improved zinc coating composition for use as a primer to prevent corrosion of metal substrates, and pertains more particularly to a coating made of siloxane polymer resin in combination with zinc dust and ceramic microspheres. The zinc coating produced is economical, highly effective, and is a great improvement over prior art coatings in regards to mud cracking, even when coated thickly.

BACKGROUND OF THE INVENTION

The use of zinc containing coatings to prevent corrosion of steel substrates is well known. The zinc and the metal substrate set up an electrochemical reaction in which the zinc particles are reduced, acting as electron donors. For this reason these types of coatings are often called cathodic coatings. Traditionally, it has been taught that very high concentrations of zinc particles must be used in order for the ions flow freely. This teaching has limited attempts to use fillers in order to lower the cost by reducing the amount of zinc present.

In U.S. Pat. No. 4,891,394 issued to Ronald R. Savin, an attempt was made to lower the percentage of zinc in a coating by replacing a portion of the zinc with hollow ceramic spheres. The spheres are lightweight and economical, but would theoretically reduce conductivity in the coating, as the spheres would separate the zinc particles from one another. For this reason, the spheres were coated with zinc prior to being incorporated into the coating in order to enhance conductivity.

U.S. Pat. No. 5,252,632 issued to Savin discloses the use of uncoated hollow glass spheres as filler. By using lightweight spheres Savin '632 teaches that a significant amount of filler can be added while maintaining the necessary conductivity. Savin '632 discloses the use of microspheres, specifically microspheres having diameters up to 150 microns.

The polymers disclosed in the patent are defined in three groups. The first group includes epoxy resins, vinyl chloride resins copolymerized with isocyanates, polyurethane resins, polyester resins, oil-modified polyester resins or alkyds, polymers of acrylic and methacrylate esters and mixtures thereof. The second group includes lattices prepared by the emulsion polymerization of monomers selected from the group consisting of acrylic, methacrylic or vinyl monomers, water-borne urethanes and mixtures thereof. The third group includes polymers which are suited for use in powder coatings applied by electrostatic means or by fluidized bed immersion techniques, including polyester powders, epoxy powders, acrylic powders, and urethane powders.

Disadvantages of the Savin '632 coating include that the addition of the spheres results in pitting of the coating surface as well as splitting or cracking of the coating, known as mud-cracking, which occurs as the solvent evaporates and the coating dries. These cracks can result in loss of anti-corrosion protection in these areas. Mud cracking increases significantly with the thickness of the coating film.

SUMMARY OF THE INVENTION

Accordingly, it is an object of the present invention to provide an improved zinc cathodic coating utilizing ceramic microspheres as filler to reduce the amount of zinc without lessening the conductivity necessary to prevent corrosion.

Another object of the present invention is to provide a coating in which the added spheres are uniformly dispersed throughout the dried coating.

Still another object of the present invention is to provide a cathodic coating which resists mud cracking, even when coated thickly.

A further object of the present invention is to provide a cathodic coating which is easily prepared and applied.

Still a further object of the present invention is to provide a coating which exhibits improved physical characteristics.

Yet another object of the present invention is to provide a coating which is economical while being highly effective.

To accomplish the foregoing and other objects of this invention there is provided a cathodic zinc coating which provides good corrosion protection at low cost, while resisting mud- cracking.

The cathodic coating of the present invention consists essentially of a polymer binder, zinc, and ceramic microspheres. The polymer material ties the pigment together and provides adhesion to the surface being coated. Zinc powder acts as a sacrificial ion to prevent corrosion of the metal substrate. The ceramic microspheres act as spacers for the zinc dust, thereby reducing the quantity of zinc necessary in the composition. This reduction results in a lighter, less expensive coating.

In the presently preferred composition, the polymer component is a liquid alkyl silicate inorganic binder, the zinc is in the form of zinc dust, and the ceramic spheres have diameters less than 45 microns. It has been discovered that the use of this class of polymer, siloxanes, in combination with microspheres of controlled and reduced diameter, results in the superior product disclosed and claimed herein.

These and other objects and features of the present invention will be better understood and appreciated from the following detailed description of the following embodiments, selected for the purposes of illustration.

DETAILED DESCRIPTION

Unless otherwise specified, all percents are percent total volume of the coating as prepared prior to application.

The presently preferred polymer component is liquid prehydrolyzed alkyl silicate inorganic binder. Alkyl silicate binder resins are typically derived from tetraethyl orthosilicate to produce liquid polysiloxane resins. Silbond XHT33 produced by Silbond Corp., at about 20 to 40% is preferred, most preferred about 40%.

A two component solvent system is utilized to lower the viscosity of the coating to a point where application is possible. Ethyl alcohol (EtOH) and propylene glycol methyl ether acetate (PGME acetate) are presently preferred. EtOH is a relatively low density solvent and therefore helps to minimize the volatile organic compounds of the coating. In addition, the evaporation rate of EtOH causes the film to dry faster. About 1 to 10% is preferred, about 5% most preferred.

PGME acetate has a somewhat slower evaporation rate than EtOH. This allows the applied film to flow together to form a more continues film and helps minimize dry spray to which inorganic zinc primers are prone. Dry spray occurs when the solvent evaporates before the paint spray reaches the surface. About 5 to 15 % is preferred, about 8.5% most preferred.

A wetting agent is added to help with dispersion of the pigments in the binder solution improving storage stability and preventing settling. Presently preferred is Anti Terra 204, a solution of a carboxylic acid salt and a polyamine amide, by BKY Chemic. About 0.1 to 2.0% is preferred, about 0.5% most preferred.

Yellow iron oxide pigment is added as a colorant. The zinc dust utilized in the present coating renders the coating gray in color. This coloring is often difficult to distinguish from the metal substrate being coated. This pigment imparts a slight yellow-green color to the coating. Bayferrox Type iron oxide by Bayer Corp. is presently preferred, at about 0.1 to2.0%, about 0.6% most preferred.

Mica is added to the coating as an inert filler. Mica 3X by Mineral Mining Company Inc. is preferred due to the particle size and low oil absorption, at about 0.5 to 5.0%, about 1.0% most preferred.

Fumed silica is added to act as an anti-sag agent. The silica helps to hold the other pigments and components of the coating is suspension during storage. It also prevents the newly applied coating from sagging off the surface until the film dries and cures. Aerosil R805 fumed silica by Degussa is presently preferred, as its surface treatment and processing make it particularly effective in inorganic zinc coatings. About 0.1 to 2.0% is preferred, about 0.5% most preferred.

Trimethyl borate acts as a moisture scavenger or desiccant to enhance storage stability. TMB-70 by Silbond Corp. is presently preferred, at about 1 to 5%, about 3% most preferred.

The ceramic microspheres act as spacers for the zinc dust. Presently preferred is Extendospheres M BL-100 by Philadelphia Quart Corp, While the product sbect states that the diameter range of the spheres is 10–100 microns, independent screening of multiple lots of BL-100 has found no spheres greater than 45 microns present The bulk density of BL-100 is 0.3g/cm3, and the compression strength is 2.5 k psi. Prsesly preferred is about 2 to 50%, about 22% most preferred.

The zinc component is zinc dust. Presently preferred is UP #6 Zn dust by Purity Zinc Metals, chosen for its purity, 74.5% metal content, at about 10 to 50%, about 18% most preferred.

The coating of the present invention can be applied by any conventional method, including spraying, dipping, and by roller.

The coating of the present invention is stored in two phases prior to application. Part A is a liquid component that contains the polymer binder, solvents, additives and pigments. This material is produced by adding the various components in order into a mixing tank. A high speed disperser is used to mix the materials together. This disperser consists of a shaft with a horizontal circular blade that turns in the liquid mixture creating shear. This shear breaks apart the agglomerated pigment particles and allows them to be coated or wet out by the binder. When the pigment is sufficiently dispersed, the physical properties such as weight per gallon and viscosity are read to determine if the batch is within acceptable parameters.

Part B consists of the dry zinc dust and ceramic microspheres. This blend is produced by premixing the microspheres and a portion of the zinc in a drum. The drum is tumbled until the dry powders are uniformly mixed. The remaining zinc is then added and the drum again tumbled until the powders are uniformly mixed.

EXAMPLE

A coating material was prepared as described above with the following % by total volume:

| Part A | | |
|---|---|---|
| Alkyl silicate resin, 40.47% | THX33 | Silbond Corp. |
| Ethyl alcohol, 5.31% | reagent grade | |
| PGMEAcetate, 8.49% | reagent grade | |
| Wetting agent, 0.54% | AntiTerra 204 | BYK Chemie |
| Yellow iron oxide pigment, 0.60% | Bayferrox | Bayer Corp. |
| Mica, 0.92% | Mica 3X | Mineral Mining Co. Inc. |
| Fumed silica anti-sag, 0.05% | Aerosil R805 | Degussa |
| Trimethyl borate, 2.79% | TMB-70 | Silbond Corp. |
| Part B | | |
| Zinc dust, 18.24% | UP#6 | Purity Zinc Metals |
| Ceramic microspheres, 22.13% | BL-100 | Philadelphia Quartz Corp. |
| The following test procedures were performed: | | |
| Bullet Hole Immersion Test | AASHTO M300 4.6.9 | Passed 500 hours |
| Salt Fog Testing | ASTM B117-90 | 2000 hours no effect |
| With epoxy topcoat | 2000 hours no effect | |
| Humidity Testing | ASTM D4585-87 | 2000 hours no effect |
| With epoxy topcoat | 2000 hours no effect | |
| Prohesion Testing | ASTM G 85 Annex A5 | Failed at 1000 hours |
| With epoxy topcoat 2000 hours no effect | | |
| Adhesion, Elcometer | ASTM D4541 modified | Passed 300 lb psi |

Application trials for visual surface properties and mud cracking indicate very good spray performance and film build up to 10 mils dry film without mud cracking.

From the foregoing description those skilled in the art will appreciate that all the objects of the present invention are realized. An improved zinc coating is provided utilizing ceramic microspheres as filler to reduce the total amount of zinc necessary without lessening the desired conductivity. The microspheres are uniformly dispersed throughout the dried coating, helping to maintain conductivity.

Further, the cathodic coating is economical, easily prepared, and easily applied using conventional methods.

Most importantly, a cathodic coating is provided which exhibits extraordinary physical characteristics. By controlling the size of the microspheres, the pitting of the surface is minimized, and mud cracking is eliminated even at thick coatings.

While a specific embodiment has been shown and described, many variations are possible. While a cathodic coating for use in anti-corrosive applications is disclosed, the coating of the present invention is also suitable for use in EMI/RFI shielding coatings, fire resistant coatings and similar coating formulations.

The alkyl silicate resin is presently preferred, but is believed other siloxane polymer resins would react in a similar manner and therefore also afford the improvements of the present invention. Zinc dust is currently incorporated into the preferred coating, but improved cathodic coatings could be produced using other conductive materials, including but not limited to other formulations of zinc, gold, silver, copper, nickel, di-iron phosphide, and mixtures thereof.

A preferred solvent system has been disclosed, but any solvent or solvent system compatible with the polymer and other components may be used. The wetting agent, anti-sag agent and desiccant disclosed have been found to perform well in the disclosed embodiment of the invention, but are illustrative only, as any suitable substitute may be made. Likewise, while the preferred filler and colorant pigments, namely mica and yellow iron oxide, are disclosed, any suitable pigments may be substituted.

Finally, the BL-100 microspheres by Philadelphia Quartz Corp. are presently preferred in the present invention, and are commercially available. However, any ceramic microsphere with similar physical properties, in which diameter can be limited may be substituted.

Having described the invention in detail, those skilled in the art will appreciate that modifications may be made of the invention without departing from its spirit. Therefore, it is not intended that the scope of the invention be limited to the specific embodiments described. Rather, it is intended that the scope of the invention be determined by the appended claims and their equivalents.

What is claimed is:

1. An improved anti-corrosive coating comprising by volume:
   about 20 to 40% inorganic polymer resin;
   about 10 to 50% conductive phase; and
   about 2 to 50% ceramic microspheres having diameters less than about 50 microns,
      whereby the resulting coating is of sufficient conductivity to inhibit corrosion on a metal substrate.

2. The coating of claim 1 wherein the polymer resin is a siloxane resin.

3. The coating of claim 1 wherein the conductive phase is metallic zinc.

4. The coating of claim 1 wherein the ceramic microspheres are hollow ceramic microspheres having diameters of about 45 microns or less, the microspheres having a bulk density of about 0.3g/cm3 and a compression strength of 2.5 k psi.

5. An improved anti-corrosive coating comprising by volume:
   about 20 to 40% at least one siloxane resin;
   about 10 to 50% conductive phase;
   about 2 to 50% ceramic nicrospberes having diameters less than about 50 microns,
      whereby the result coating is of sufficient conductivity to inhibit corrosion on a metal substrate.

6. The coating of claim 5 wherein the siloxane resin is a prehydrolyzed alkyl silicate.

7. The coating of claim 5 wherein the conductive phase is metallic zinc.

8. The coating of claim 5 wherein the ceramic microspheres are hollow ceramic microspheres having diameters of about 45 microns or less, the microspheres having a bulk density of about 0.3g/cm3 and a compression strength of 2.5 k psi.

9. The coating of claim 5 further including at least one organic solvent.

10. The coating of claim 5 further including at least one wetting agent.

11. The coating of claim 5 further including at least one inert filler pigment.

12. The coating of claim 5 further including at least one anti-sag agent.

13. The coating of claim 5 further including at least one desiccant material.

14. An improved anti-corrosive coating comprising by volume:
   about 20 to 40% prehydrolyzed alkyl silicate resin;
   about 10 to 50% conductive phase;
   about 2 to 50% ceramic microspheres having diameters less than about 50 microns;
   about 6 to 25% at least one organic solvent;
   about 0.1 to 2% at least one wetting agent;
   about 0.1 to 2% at least one anti-sag agent; and
   about 1 to 5 % at least one desiccant material, whereby the resulting coating is of sufficient conductivity to inhibit corrosion on a metal substrate.

15. The coating of claim 14 wherein the conductive phase is metallic zinc dust.

16. The coating of claim 14 wherein the organic solvent is selected from the group consisting of ethyl alcohol, propylene glycol methyl ether acetate, and mixtures thereof.

17. The coating of claim 14 wherein the wetting agent is a solution of a carboxylic acid salt and a polyamine amide.

18. The coating of claim 14 further including at least one inert filler pigment.

19. The coating of claim 18 wherein the inert filler pigment is mica.

20. The coating of claim 14 wherein the anti-sag agent is fumed silica.

21. The coating of claim 14 wherein the desiccant is trimethyl borate.

22. An improved anti-corrosive coating comprising by volume:
   about 30 to 40% prehydrolyzed alkyl silicate resin;
   about 15 to 35% conductive phase;
   about 10 to 40% ceramic microspheres having diameters less than about 50 microns;
   about 10 to 20% at least one organic solvent;
   about 0.3 to 1.5% at least one wetting agent;
   about 0.3 to 1.5% at least one anti-sag agent; and
   about 2 to 4% at least one desiccant material whereby the result coating is of sufficient conductivity to inhibit corrosion on a metal substrate.

23. The coating of claim 22 wherein the conductive phase is metallic zinc dust.

24. The coating of claim 22 wherein the organic solvent is selected from the group consisting of ethyl alcohol, propylene glycol methyl ether acetate, and mixtures thereof.

25. The coating of claim 22 wherein the wetting agent is a solution of a carboxylic acid salt and a polyamine amide.

26. The coating of claim 22 further including at least one inert filler pigment.

27. The coating of claim 22 wherein the inert filler pigment is mica.

28. The coating of claim 22 wherein the anti-sag agent is fumed silica.

29. The coating of claim 22 wherein the desiccant is trimethyl borate.

30. An improved cathodic coating comprising:
a liquid component comprising by total volume;
about 40.5% liquid prehydrolyzed alkyl silicate;
about 5.31% ethyl alcohol;
about 8.48% propylene glycol methyl ether acetate;
about 0.54% wetting agent;
about 0.60% yellow iron oxide pigment;
about 0.94% mica;
about 0.50% fumed silica; and
about 0.60% trimethyl borate; in combination with;
a dry component comprising by total volume;
about 18.24% zinc dust; and
about 22.13% ceramic microspheres having diameters less than about 50 microns;
whereby upon mixing the liquid component and the dry component prior to application, the resulting coating is of sufficient conductivity to inhibit corrosion on a metal substrate.

* * * * *

UNITED STATES PATENT AND TRADEMARK OFFICE
CERTIFICATE OF CORRECTION

PATENT NO.     : 6,287,372 B1
DATED          : September 11, 2001
INVENTOR(S)    : Remi Briand; Hylen Keith Freeman It is certified that error appears in the above-identified patent and that said Letters Patent is hereby corrected as shown below:

<u>Title page,</u>
Assignee: delete "Themec" and insert -- Tnemec --.

<u>Claim 5,</u>
Line 47, delete "nicospberes" and insert -- microspheres --.

<u>Claim 22,</u>
Line 47, delete "result" and insert -- resulting --.

<u>Claim 30,</u>
Line 4, delete "5.3 1%" and insert -- 5.31% --.

Signed and Sealed this

Twenty-sixth Day of February, 2002

*Attest:*

*Attesting Officer*

JAMES E. ROGAN
*Director of the United States Patent and Trademark Office*